United States Patent [19]

Calagui

[11] Patent Number: 4,506,469
[45] Date of Patent: Mar. 26, 1985

[54] TWIN FISH HOOK

[76] Inventor: Juanito B. Calagui, 55-56 Calle Uno St., Caloocan City, Metro Manila, Philippines

[21] Appl. No.: 519,176

[22] Filed: Jul. 20, 1983

[30] Foreign Application Priority Data

Jan. 24, 1983 [PH] Philippines .................. 8214[U]

[51] Int. Cl.³ .............................................. A01K 83/00
[52] U.S. Cl. ........................................................ 43/34
[58] Field of Search .................... 43/34, 36, 37, 89

[56] References Cited

U.S. PATENT DOCUMENTS

| 684,211 | 10/1901 | Ferch . | |
| 1,156,795 | 10/1915 | Mau . | |
| 2,223,946 | 12/1940 | Binkowski | 43/36 |
| 2,474,481 | 6/1949 | Kleppen | 43/37 |
| 2,543,501 | 2/1951 | Kleppen | 43/37 |
| 2,982,047 | 5/1961 | Wilshusen | 43/36 |
| 3,175,322 | 3/1965 | Snyder | 43/36 |
| 3,241,260 | 3/1966 | Keller | 43/36 |

FOREIGN PATENT DOCUMENTS 63386 8/1892 Fed. Rep. of Germany .......... 43/34

Primary Examiner—Gene P. Crosby
Attorney, Agent, or Firm—Kerkam, Stowell, Kondracki & Clarke

[57] ABSTRACT

A fish hook uses two hooks mounted to shanks which are pivotably connected together by a pivot pin. The upper ends of the shanks include fork members which mate with one another and in which the pivot pin is seated. The lower ends of the shanks include hooks which spread apart in parallel planes upon a fish bitting the fish hook.

7 Claims, 5 Drawing Figures

TWIN FISH HOOK

This utility model relates in general to devices used for catching fish and more particularly to a twin fish hook having an oppositely disposed barb adapted for automatically catching fish which diverge in direction when swallowed with the bait.

Conventional fish hook used nowadays are usually made of a single shank at the upper end of which is attached the line and at the lower end is an integral bent portion in which the free end thereof is a pointed end forming a wedge-shaped. In this type of fish hook when used, the fish that swallowed the fish hook with the bait sometimes escaped when the pointed end thereof is not in the right position at the mouth of the fish.

The aforementioned drawback will be eliminated by means of the novel construction of the present utility model called twin fish hook having an automatic members that when swallowed with the bait by fish, the pointed ends of said fish hook will automatically diverge in direction thus capturing the fish in a sure way whatever the position of the pointed ends at the mouth of the fish.

Several improvements have been made in the traditional fishing hook but still found to be unsatisfactory in performance and the construction is very complicated thus making said fish hook expensive.

Therefore, the object of the present utility model is to provide a twin fish hook that automatically catch the fish in a sure way when swallowed with the bait said fish hook thus the time and effort is considerably reduced.

Another object of the present utility model is to provide a twin fish hook that is simple in construction and less expensive compared to any other fish hook which is complicated in construction.

A further object of the present utility model is to make the twin fish hook efficient in operation and can be used conveniently by anyone.

The foregoing objectives and other advantages of the twin fish hook will more clearly appear from the following detailed description of a preferred embodiment as shown in the accompanying drawings, in which.

Figure 1:
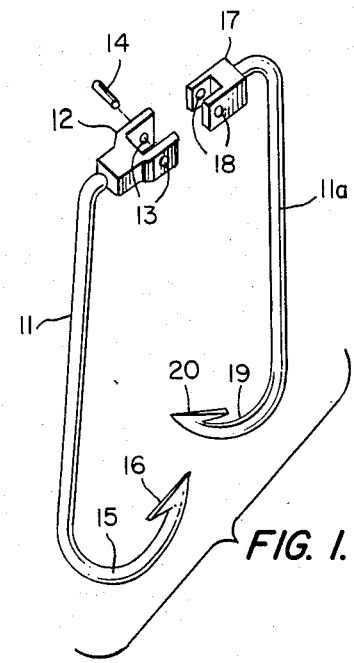
FIG. 1 is an exploded perspective view of a twin fish hook.
Figure 3:
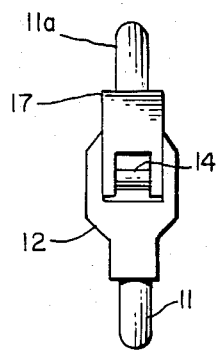
FIG. 3 is an enlarged top view of the same.

Referring now to the different views of the drawings wherein like reference numbers refer to like parts throughout the description, there is shown a twin fish hook generally designated as 10 comprising oppositely disposed shanks 11 and 11a. At the upper free end of said shank 11 integrally connected is a first horizontal fork member 12 having holes 13 adjacent to its free ends adapted to receive the cylindrical pin 14. Integrally connected to said shank 11 at the lower end is an inwardly bent portion 15 in which the free end thereof is tapering upwardly forming an arrow-head shaped 16. A second horizontal fork member 17 which is smaller in size than said first horizontal fork member 12 is integrally connected at the upper free end of said shank 11a having a hole 18 adjacent to its free ends adapted to receive said cylindrical pin 14. Said first and second horizontal fork members are pivotally connected to said cylindrical pin 14 in opposite direction. At the lower end of said shank 11a integrally connected is another inwardly bent portion 19 in which the free end thereof is tapering upwardly forming an arrow-head shaped hook 20. The cable wire (not shown) is fixedly attached to said cylindrical pin 14.

Figure 2:
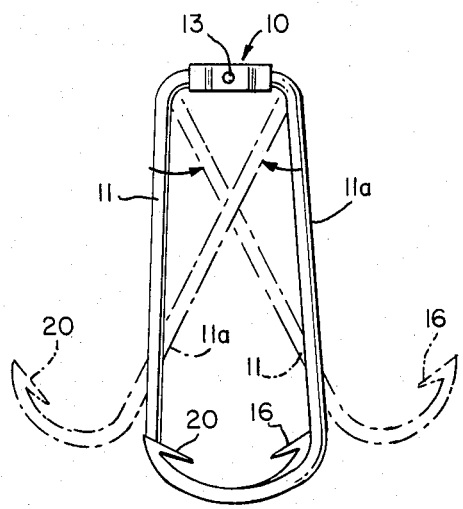
FIG. 2 is a front view of the same showing the barb slidably diverge in direction.

In operation when the twin fish hook 10 is set as shown in FIG. 2, the inwardly bent portion 15 and 19 coincide (i.e., attempt to take up the same place in space). When the fish bites on the twin fish hook 10 with the bait (not shown), the shanks 11 and 11a are pushed apart or diverged in direction as shown in dotted lines at FIG. 2.

Figure 4:
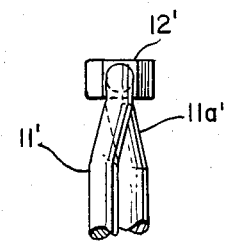
FIG. 4 shows a side view of an alternate embodiment of the present invention with parts broken away.
Figure 5:
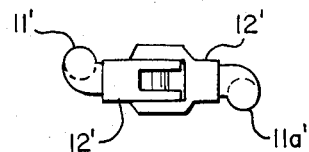
FIG. 5 shows a top view of the alternate embodiment.

FIGS. 4 and 5 show an alternate embodiment of the present invention where the shanks 11' and 11A' are slightly offset from each other. For simplicity sake, the numerals for the parts shown in FIGS. 4 and 5 are the same as the numerals for the corresponding part in the first embodiment of the present invention except that primes have been added. The offsetting of the shanks 11' and 11a' are helpful in allowing the shanks to move from the normal position (solid line in FIG. 2) to the diverged position (dotted line in FIG. 2).

The operation of the embodiment of FIGS. 4 and 5 is the same as illustrated in FIG. 2. When a fish bites on the hook, the upper ends of the shanks 11' and 11a' move closer together whereas the lower ends of the shanks move further apart to the dotted line position of FIG. 2, the shanks crossing each other as shown in FIG. 2 for shanks 11 and 11a.

As will be readily appreciated, the operation of the fish hook is latchless, meaning that there is no latching mechanism which must be triggered to cause the divergence of the fish hooks. Instead, the biting of the fish atuomatically diverts the fish hooks to the dotted line position of FIG. 2.

Although specific embodiments have been disposed herein, it is to be appreciated that these are for illustrative purposes only. Various modifications and adaptations will be apparent to those of ordinary skill in the art. Accordingly, the scope of the present invention should be determined by reference to the appended claims.

I claim:

1. A fish hook comprising:
   (a) first and second oppositely disposed shanks having upper and lower ends and extending vertically;
   (b) a first fork member at the upper end of said first shank and a second fork member at the upper end of said second shank and fitting within said first fork member;
   (c) a connecting pin pivotably connecting said first fork member to said second fork member such that said first and second shanks are pivotable in respective first and second parallel planes; and
   (d) first and second hooks disposed at said lower ends of said respective first and second shanks; and
wherein said fish hook is disposable in:
   (i) a normal position in which said first and second hooks are in coinciding and oppositely facing relatively close positions in said respective first and second parallel planes; and
   (ii) a diverged position in which said first and second shanks are crossing each other and said first and second hooks are spread apart;

and wherein said fish hook is operative to change from said normal position to said diverged position when a fish bites on said lower ends to cause said first and second shanks to pivot such that said upper ends move closer together and said lower ends including said first and second hooks move further apart.

2. The fish hook of claim 1 wherein said fish hook is latchless.

3. A fish hook comprising:
   (a) first and second oppositely disposed shanks having upper and lower ends and extending vertically;
   (b) first and second fork members disposed at said respective upper ends of said first and second shanks, said second fork member fitting within said first fork member;
   (c) a connecting pin pivotably connecting said first fork member to said second fork member such that said first and second shanks are pivotable in respective first and second parallel planes; and
   (d) first and second hooks disposed at said lower ends of said respective first and second shanks; and
   wherein said fish hook is disposable in:
   (i) a normal position in which said first and second hooks are in coinciding and oppositely facing relatively close positions in said respective first and second parallel planes; and
   (ii) a diverged position in which said first and second hooks are spread apart; and
   wherein said fish hook is operative to change from said normal position to said diverged position when a fish bites on said lower ends.

4. The fish hook of claim 3 wherein said fish hook is latchless.

5. The fish hook of claim 4 wherein said first and second shanks are crossed when said fish hook is in said diverged position.

6. A fish hook comprising:
   (a) first and second oppositely disposed shanks having upper and lower ends and extending vertically;
   (b) first and second connecting portions at said respective upper ends of said first and second shanks said first and second connecting portions being respectively first and second fork members and wherein said second fork member fits within said first fork member;
   (c) a connecting pin pivotably connecting said first and second connecting portions such that said first and second shanks are pivotable in respective first and second parallel planes; and
   (d) first and second hooks disposed at said lower ends of said respective first and second shanks; and
   wherein said fish hook is disposable in;
   (i) a normal position in which said first and second hooks are in coinciding and oppositely facing relatively close positions in said respective first and second parallel planes; and
   (ii) a diverged position in which said first and second hooks are spread apart and
   wherein said fish hook is latchless and is operative to change from said normal position to said diverged position when a fish bites on said fish hook.

7. The fish hook of claim 6 wherein said first and second hooks are respectively coplanar with said first and second shanks and said first and second shanks pivot in said first and second parallel planes.

* * * * *